United States Patent
Jensen

(10) Patent No.: US 9,207,103 B2
(45) Date of Patent: Dec. 8, 2015

(54) QUICK-RELEASE COUPLING

(71) Applicant: TI Automotive (Fuldabrück) GmbH, Fuldabrück (DE)

(72) Inventor: Hans Jensen, Dettingen unter Teck (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 138 days.

(21) Appl. No.: 14/086,232

(22) Filed: Nov. 21, 2013

(65) Prior Publication Data

US 2014/0137655 A1 May 22, 2014

(30) Foreign Application Priority Data

Nov. 22, 2012 (EP) ..................................... 12193905

(51) Int. Cl.
*G01D 11/30* (2006.01)
*F16L 41/00* (2006.01)
*G01L 19/14* (2006.01)
*G01L 19/00* (2006.01)

(52) U.S. Cl.
CPC .............. *G01D 11/30* (2013.01); *F16L 41/008* (2013.01); *G01L 19/0038* (2013.01); *G01L 19/141* (2013.01)

(58) Field of Classification Search
CPC ....................................................... G01D 11/30
USPC ........................................................... 73/756
See application file for complete search history.

(56) References Cited

U.S. PATENT DOCUMENTS

| | | | |
|---|---|---|---|
| 6,199,432 B1* | 3/2001 | Dunn | 73/756 |
| 2010/0275699 A1* | 11/2010 | Seeberg et al. | 73/756 |
| 2010/0276008 A1* | 11/2010 | Abrams | 137/68.14 |
| 2012/0326439 A1* | 12/2012 | Bogert et al. | 285/354 |

FOREIGN PATENT DOCUMENTS

| | | |
|---|---|---|
| DE | 20 2006 016186 U1 | 3/2008 |
| DE | 10 2008 043323 A1 | 5/2010 |
| EP | 2 505 900 A1 | 10/2012 |
| JP | 11 118648 A | 4/1999 |
| WO | WO 2010/015912 A1 | 2/2010 |

OTHER PUBLICATIONS

European Patent Office, International Search Report in European Patent Application No. 12 19 3905 (Mar. 20, 2013).

* cited by examiner

*Primary Examiner* — Lisa Caputo
*Assistant Examiner* — Jamel Williams
(74) *Attorney, Agent, or Firm* — Leydig, Voit & Mayer, Ltd.

(57) ABSTRACT

A quick release coupling for connecting at least two connecting elements of a fluid system for a liquid medium, and comprises a coupling body, defining a flow channel between a first connecting end for the connection of a first connecting element, and a second connecting end. The coupling body includes a sensor chamber separated from the flow channel by a separating wall. At least one sensor is disposed in the sensor chamber, wherein a sensor probe is connected to the sensor, which extends through the separating wall from the sensor such that an end of the sensor probe facing the flow channel is in communication with the flow channel. The coupling body rests against the sensor probe without a seal. The sensor probe is a capillary tube and could be made of glass.

10 Claims, 2 Drawing Sheets

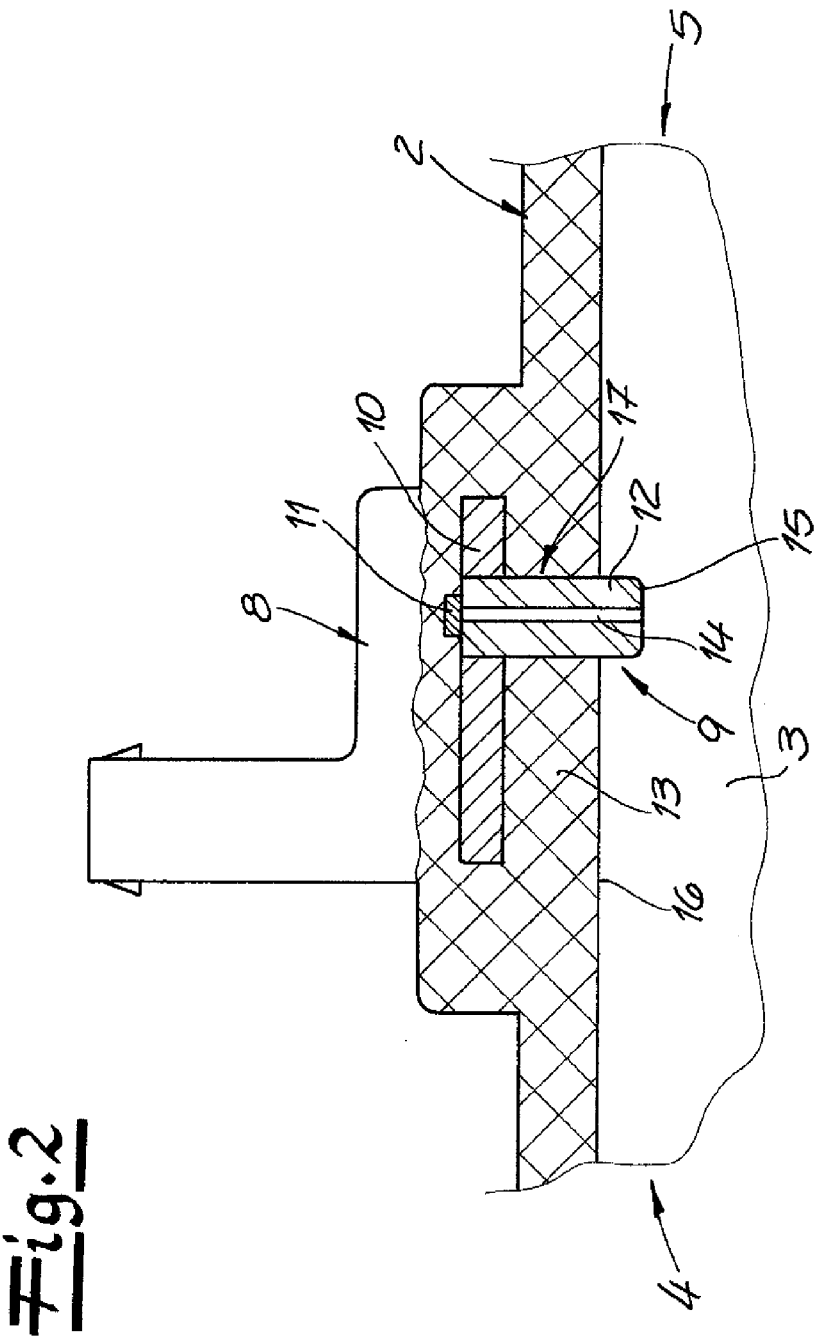

QUICK-RELEASE COUPLING

CROSS-REFERENCE TO RELATED APPLICATION

This application claims priority pursuant to Title 35 USC Section 119 to European Patent Application No. 12 193 905.2 filed Nov. 22, 2012, entitled "Quick Release Coupling," the entire specification and drawings of which are hereby incorporated by reference herein as if fully set forth.

The invention concerns a coupling for connecting at least two connecting elements for a liquid medium, a fluid line coupling, for example, for connecting two fluid lines for a liquid medium.

Couplings of the type specified above are known in the field and have basically been found to be effective. Furthermore, the equipping of couplings with additional furnishings, for obtaining data regarding the liquid medium flowing through the body of the coupling is known. As such, it is known, for example, to incorporate temperature sensors in the walls of the coupling body, by means of which the temperature of the liquid medium flowing through the body of the coupling can be determined. One disadvantage with the couplings known in the field is the high degree of complexity involved in the production thereof. Furthermore, it is worthwhile to improve the functional reliability of the couplings known in the field.

The invention addresses the technical problem of providing a coupling of the type specified above, which is distinguished by a high degree of functional reliability, which can be easily manufactured, and with which the properties of the liquid medium flowing through the body of the coupling can be determined. Furthermore, the invention addresses the technical problem of providing a quick-release coupling configuration for solving the problems described above.

SUMMARY OF DISCLOSURE

In order to solve the technical problems, the invention teaches of a coupling for connecting at least two connecting elements for a liquid medium, for example, connecting two fluid line couplings from two fluid lines for a liquid medium, having a coupling body, wherein the coupling body comprises a first connecting end for the connection of a first connecting element, and a second connecting end for the connection of a second connecting element, wherein a flow channel between the first connecting end of the coupling body and the second connecting end of the coupling body is formed in the coupling body, wherein the coupling body includes a sensor chamber, separated from the flow channel by a separating wall, wherein a sensor is disposed in the sensor chamber, wherein a sensor probe is connected to the sensor, said sensor probe extending from the sensor through the separating wall such that a flow channel end (the free end) of the sensor probe is in contact with the flow channel, and wherein the coupling body rests against the sensor probe without a seal. That the free end of the sensor probe is in contact with the flow channel means, in particular, that liquid medium flowing through the flow channel flows over the sensor probe. The coupling can be used in a motor vehicle, or an internal combustion engine, respectively. For practical purposes, the coupling is a component of a fuel line and/or a brake fluid line, or urea solution line. A connecting element can be a tube, a hose line, a tank or a similar item. The liquid medium is a liquid selected from the group "fuel, brake fluid, urea solution." In the framework of the invention, a connecting end is a coupling point for a connecting element. By way of example, the coupling end can be an accommodation for the end of a tube (insert component) or a hose connection. According to one embodiment, a connecting end is an attachment point between the coupling body and a tank.

For practical purposes, the coupling body includes an intake opening at the first connecting end, and a discharge opening at the second connecting end. It is particularly preferred that the flow channel is designed as a through hole, in which the flow channel extends advantageously from the intake opening to the discharge opening. In the framework of the invention, the through hole includes a circular cross-section. The flow channel includes a retaining part probe starting at the intake opening, wherein a sealing section adjoins the retaining part probe, for practical purposes, at the end toward the discharge opening. A diameter of the sealing section is, for practical purposes, smaller than a diameter of the retaining part segment. It is possible that a least one sealing element is disposed in the sealing section. It is recommended that the sealing element is formed by two O-ring gaskets, wherein in one embodiment an intermediate element, designed as a ring, is located between the two O-ring gaskets.

It is recommended that the sensor chamber is formed on the coupling body in a irreversible manner. It is possible that at least two sensors, or a plurality of, or numerous sensors are disposed in the sensor chamber. Preferably, the sensor chamber includes a rectangular cross-section, and can be designed as a cuboid. It is particularly preferred that the separating wall is a section of the coupling body which forms a part of the sensor chamber and forms a section of a flow channel wall. The sensor segment preferably passes through the separating wall, and extends into the flow channel, or into the through hole, respectively, according to one embodiment. For practical purposes, the flow channel walls are formed by the walls of the coupling body, such that the sensor segment extends, starting from the walls of the coupling body, preferably in the radial direction in relation to the flow channel, into the flow channel. It is recommended that the sensor segment extends preferably in the radial direction into the flow channel. According to another embodiment, the sensor segment passes through the separating wall, and is located in the walls of the coupling body, with the stipulation that the sensor segment can be brought into contact with the liquid medium that can be transported through the flow channel, and the end of the sensor segment lies in a plane coinciding with the walls of the coupling body at the end toward the flow channel. In other words, according to the other embodiment, the sensor segment does not extend beyond the walls of the coupling body, or, respectively, the sensor segment is flush with a surface of the walls at the end toward the flow channel.

Preferably the sensor segment is designed, in particular, as a cylindrical sleeve, wherein the sleeve extends, starting from the sensor, through the separating wall toward the flow channel, and preferably into the flow channel of the coupling body. An end of the sleeve facing toward the flow channel is preferably disposed within the flow channel. It is possible that the end of the sleeve facing the flow channel forms a section of the surface of the walls of the coupling body facing the flow channel, and preferably does not extend into the flow channel. The sleeve is preferably made of a rigid, or substantially rigid material. It is recommended that the sleeve consists entirely, or substantially entirely, of glass. It is possible that the sleeve be made of a metal, such as steel, for example.

For practical purposes, the sensor segment includes a capillary tube, wherein the capillary tube extends toward the sensor starting from the end of the sensor segment at the flow channel (the free end). By means of the capillary tube, a liquid transporting connection between the sensor and the flow channel is advantageously provided. It is particularly preferred that the capillary tube is disposed centrally in the sensor segment, which is preferably designed in the shape of a cylinder. It is recommended that the sensor segment includes a circular or oval cross-section. It is possible for the sensor probe to exhibit any arbitrary cross-section, e.g. rectangular or polygonal. Preferably, the capillary tube extends along the longitudinal axis of the sensor probe. In the framework of the invention the diameter of the capillary tube is substantially smaller than the diameter of the sensor probe, preferably designed as a circular cylinder, or the sleeve, preferably designed as a circular cylinder, respectively.

Advantageously, the sensor chamber is designed as a solid body. A solid body means, in particular, that the sensor chamber is a solid, without any hollow chambers. The sensor is preferably accommodated in the sensor chamber in a form-locking or force-locking manner. In this manner, a sensor chamber is provided that is distinguished by a high functional reliability and mechanical stability. In the framework of the invention, a circuit board is connected to the sensor, wherein said circuit board processes the measurement signals received from the sensor. According to one embodiment, a contact region is formed on the coupling body, preferably as a single piece therewith, wherein the contact region includes electrical coupling elements for practical purposes, with which the measurement data from the coupling body, received from the sensor and/or processed by the circuit board, can be read out. It is preferred that the circuit board is accommodated in the measurement chamber in a form-locking or force-locking manner.

It is particularly preferred that the coupling body be designed as a single-piece unit. In the framework of the invention the sensor chamber is an integral component of the coupling body, or is designed as a single piece together with the coupling body, respectively. The sensor chamber is particularly preferably connected to the coupling body without being attached by means of welding. Fundamentally, it is possible that at least two sensor chambers are disposed on the coupling body, and by way of example, a plurality of, or numerous, sensor chambers are disposed thereon. For practical purposes, one sensor is disposed in each sensor chamber. By way of example, one sensor chamber may contain a pressure sensor, and a second sensor chamber may contain a temperature sensor.

It is particularly preferred that the coupling body is formed by means of insert molding of the sensor unit or sensor units formed by the sensor, the sensor probe and/or the circuit board. According to one embodiment, at least two sensor units are formed by insert molding in order to form the coupling body. For practical purposes, the sensor unit, or sensor units, respectively, are insert molded in a preferably thermoplastic synthetic material in order to form the coupling body. The coupling body preferably rests against the sensor probe in a water-tight manner. In this manner, the connection between the coupling body and the senor and/or sensor probe can be obtained without a seal. According to one embodiment, the coupling body lies directly against the sensor, or each sensor, respectively, and/or the sensor probe, or each sensor probe, respectively. It is particularly preferred that the coupling body lie directly against the sleeve of the sensor. This means that in the framework of the invention, no further components are disposed between the coupling body and the sensor probe, or the sleeve, respectively.

According to one embodiment, the coupling body is made of plastic. By way of example, the coupling body consists, at least in part, and preferably entirely, or substantially entirely, of an electrically conductive plastic (ESD plastic). Preferably the coupling body consists substantially of a preferably electrically conductive thermoplastic material. Fundamentally, it is possible that the coupling body consists substantially of a thermoset material. The thermoplastic material comprises at least one component selected from the group "polyamide, polyphthalamide," for example.

Furthermore, in order to solve the technical problems, the invention teaches of a quick-release coupling configuration having a coupling according to claim 1, having an insert part and a retaining part, wherein the insert part can be inserted into an intake opening of the flow channel in the coupling body disposed at the first connecting end, and wherein the insert part can be attached to the retaining part in the coupling body in a fixed manner. It is possible that the quick-release coupling configuration includes a second coupling body, in addition to the coupling or in addition to the coupling body, respectively. In other words, the quick release coupling has a connector body, wherein the connector body is formed by the coupling body and the second coupling body, wherein the second coupling body is preferably joined to the coupling body in a water-tight manner. It is recommended that the second coupling body includes an additional connecting element, to which further connecting elements, e.g. a tube, a hose line, a tank, or similar items, can be connected. The insert part is preferably a hollow and preferably rigid tube, having a front end. For practical purposes, the insert part contains an annular bulge (flaring), expanding in the radial direction, wherein said bulge is designed such that it is at a spacing to the front of the insert part. In the framework of the invention, a cylindrical sealing surface is formed between the front end of the insert part and the bulge. In the assembled state of the quick-release coupling configuration, the insert part is inserted in the flow channel, with the stipulation that the cylindrical sealing surface is disposed in the sealing section of the coupling body, and rests in a water-tight manner against the sealing element.

For practical purposes, a water-tight connection is provided between the insert part and the coupling body by means of a water-tight connection of the cylindrical sealing surface to the sealing element, and by means of a water-tight connection of the sealing element to the coupling body. According to one embodiment, the retaining part is disposed in the retaining part section of the through hole, when the quick-release coupling configuration is in the assembled state, wherein the retaining part anchors the insert part in the coupling body. It is particularly preferred that a connecting surface at the retaining part end rests against a front end of the bulge on the insert part facing the intake opening, when in the assembled state. The retaining part is particularly preferably designed as a separate component, or as a component differing from the coupling body, respectively. It is possible that the retaining part is a horse-shoe retaining part, or includes a U-shape, respectively. According to another embodiment, the retaining part is designed in the shape of a ring, wherein said ring at least partially encompasses the coupling body and/or entirely encompasses the insert part. It is particularly preferred that the retaining part is disposed in the retaining part section of the coupling body, when in the assembled state.

The invention is based on the understanding that the coupling according to the invention, or the quick-release coupling configuration according to the invention, respectively, is distinguished by a surprisingly simple construction and high degree of functional reliability. The connection of the sensor probe to the coupling body without a seal is a substantial aspect of the coupling according to the invention, by means of which the handling of numerous different components is avoided in the production of the coupling according to the invention. The advantageous single-piece design of the coupling body and the sensor chamber, in accordance with the invention, ensures, in a functionally reliable manner, an exceptional encapsulation of the sensor, or the sensor unit, respectively, in relation to the ambient atmosphere surrounding the coupling, by means of which contamination of the sensor unit can likewise be prevented, as well as the contamination of the sensor with fuel, urea solutions, water, or other liquids. As a result, the coupling according to the invention and the quick-release coupling configuration is distinguished by an exceptional durability, mechanical stability and reliability with regard to malfunctions.

DESCRIPTION OF THE DRAWINGS

The invention shall be explained in greater detail below, based on drawings depicting a single embodiment example. They show, schematically.

DETAILED DESCRIPTION OF ILLUSTRATED EMBODIMENT

Figure 1:
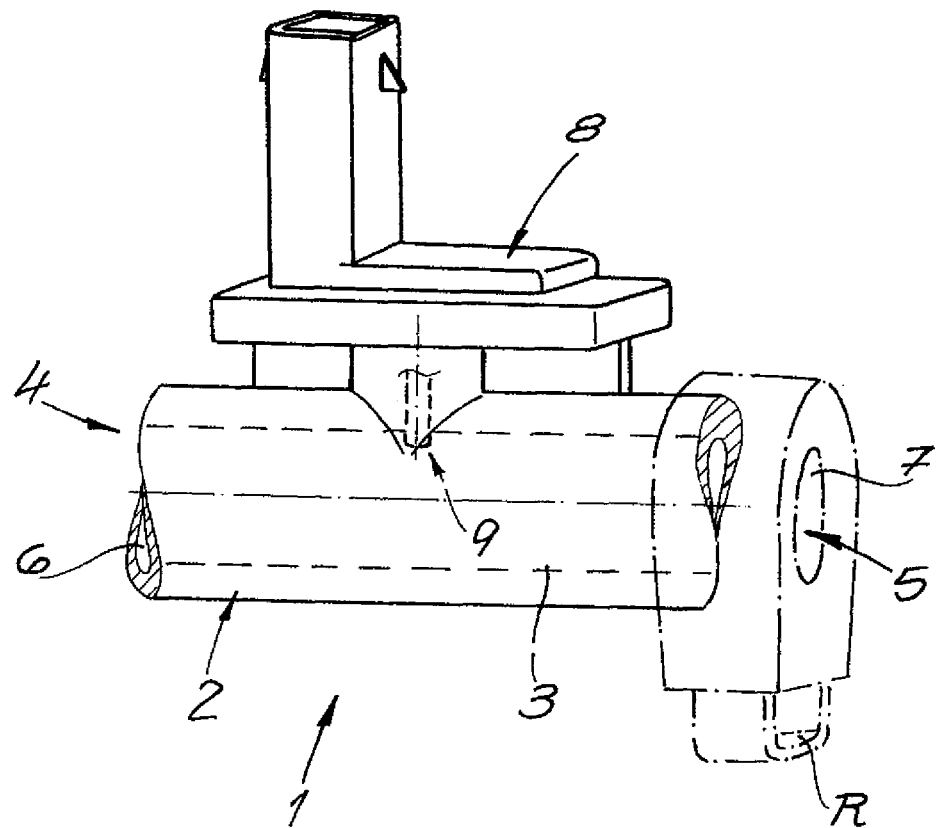
FIG. 1 a side view of a quick-release coupling configuration according to the invention, and FIG. 2 a partially cutaway side view of the quick-release coupling configuration according to FIG. 1.

FIG. 1 shows a quick-release coupling configuration 1 for connecting two connecting elements for a liquid medium. The quick-release coupling configuration 1 according to the figures includes a coupling body 2, wherein a flow channel, or a through hole 3, respectively, is created in said coupling body 2. The through hole 3 connects a first connecting end 4 with a second connecting end 5. At the first connecting end 4, the coupling body 2 includes an intake opening 6, wherein the through hole 3 extends from said intake opening 6 to a discharge opening 7 disposed at the second connecting end 5. The second connecting end 5 is designed as a tube accommodation according to FIG. 1, wherein an end shape of a tube, not shown, can be anchored in said tube accommodation by means of a retaining part R, indicated by a line comprising dots and dashes.

Moreover, it is shown in FIG. 1 that the coupling body 2 includes a sensor chamber 8, wherein said sensor chamber is formed as a single unit integrated in the coupling body 2, according to the embodiment example.

According to FIG. 2, a sensor unit 9 is disposed in the sensor chamber 8, wherein said sensor unit 9 includes a circuit board 10, a sensor 11, designed as a pressure sensor, and a sensor probe, designed as a sleeve 12. According to FIG. 2, the circuit board 10 and the sensor 11 are accommodated in the sensor chamber 8 in a form-locking manner. According to the embodiment example, the sensor chamber 8 is designed as a solid body, in which the circuit board 10 and the sensor 11 are accommodated, without any hollow spaces. The sleeve 12 extends from the sensor 11, according to FIG. 2, through a separating wall 13, in the axis of the through hole 3. A capillary tube 14 is disposed in the sleeve 12 according to the embodiment example, wherein said capillary tube 14 represents a fluid path between the sensor 11 and the through hole 3. According to the embodiment example, it is possible that a liquid medium flowing through the capillary tube 14 can come in contact with the sensor 11. A front end, or free end 15, respectively, of the sleeve 12 extends into the through hole 2 according to the embodiment example. This means that a front end 15 of the sleeve 12 facing the through hole extends beyond a surface 16 facing the coupling body, encompassing the through hole 3, and extends into the through hole 3. The sleeve 12 consists of glass according to the embodiment example.

The coupling body 2 depicted in the figures consists substantially of a thermoplastic material. According to the embodiment example, the sensor 11 is a pressure sensor. Moreover, it can be seen in FIG. 2 that there is no seal, or no sealing configuration disposed between the walls 17 of the coupling body 2, said walls consisting of the thermoplastic material, and the sleeve 12 made of glass. According to the embodiment example, the walls 17 rest directly against the sleeve 12 of the sensor unit 9.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A quick release coupling for connecting to elements of a fluid system, said coupling comprising a coupling body, defining a flow channel between a first connecting end and a second connecting end, and a sensor chamber as an integral component of said coupling body separated from the flow channel by a separating wall, a sensor unit disposed in the sensor chamber, comprising a sensor and a sensor probe, wherein the sensor probe is connected to the sensor, and extends from the sensor through the separating wall, such that an end of the sensor probe facing toward the flow channel is in communication with the flow channel, wherein the coupling body is a single piece unit that rests directly against the sensor and the sensor probe and wherein the sensor is accommodated in the sensor chamber in a form-locking manner.

2. The quick release coupling according to claim 1, wherein the sensor probe is barrier-free so that fluid flowing through the flow channel contacts the sensor through the sensor probe.

3. The quick release coupling according to claim 1, wherein the sensor probe is a capillary tube, said capillary tube extending to the sensor from a free end of the sensor probe.

4. The quick release coupling according to claim 1, wherein the sensor chamber is designed as a solid body.

5. The quick release coupling according to claim 1 wherein the coupling body is generated by insert molding of said sensor unit into said coupling body and said sensor unit further includes a circuit board.

6. The quick release coupling according to claim 5, wherein the coupling body is made of a plastic.

7. The quick release coupling according to claim 1, wherein the coupling body consists substantially of a thermoplastic material.

8. The quick release coupling according to claim 7, wherein the thermoplastic material comprises at least one component from the group "polyamide, polyphthalamide".

9. The quick release coupling according to claim 1, wherein the sensor is a pressure sensor.

10. A quick-release coupling configuration having a coupling according to claim 1, comprising an insert part and a retaining part, wherein the insert part can be inserted in one connecting end of the flow channel in the coupling body disposed on the first connecting end, and wherein the insert part can be anchored in the coupling body with the retaining part.

\* \* \* \* \*